US008640460B2

(12) United States Patent
Caspers

(10) Patent No.: US 8,640,460 B2
(45) Date of Patent: Feb. 4, 2014

(54) OCEAN WAVE ELECTRICAL GENERATOR

(76) Inventor: Richard J. Caspers, Glenview, IL (US)

( * ) Notice: Subject to any disclaimer, the term of this patent is extended or adjusted under 35 U.S.C. 154(b) by 180 days.

(21) Appl. No.: 13/119,110

(22) PCT Filed: Sep. 15, 2009

(86) PCT No.: PCT/US2009/056938
§ 371 (c)(1),
(2), (4) Date: May 3, 2011

(87) PCT Pub. No.: WO2010/031038
PCT Pub. Date: Mar. 18, 2010

(65) Prior Publication Data
US 2011/0197583 A1    Aug. 18, 2011

Related U.S. Application Data

(60) Provisional application No. 61/096,896, filed on Sep. 15, 2008.

(51) Int. Cl.
*F03B 17/02* (2006.01)
*F03B 7/00* (2006.01)
*F03G 3/04* (2006.01)

(52) U.S. Cl.
USPC .............................. 60/639; 60/495

(58) Field of Classification Search
USPC .......................... 60/639–640; 198/778; 415/5
See application file for complete search history.

(56) References Cited

U.S. PATENT DOCUMENTS

| 1,037,390 | A | * | 9/1912 | Wirt | 60/506 |
|---|---|---|---|---|---|
| 3,857,476 | A | | 12/1974 | Heifetz et al. | |
| 4,112,686 | A | * | 9/1978 | Trotta | 60/639 |
| 4,172,689 | A | * | 10/1979 | Thorsheim | 415/7 |
| 4,242,868 | A | | 1/1981 | Smith | |
| 4,538,415 | A | * | 9/1985 | Lebecque | 60/639 |
| 5,970,712 | A | | 10/1999 | Stein | |
| 6,051,891 | A | | 4/2000 | Surodin | |
| 6,817,180 | B2 | | 11/2004 | Newman | |
| 7,134,283 | B2 | | 11/2006 | Villalobos | |
| 2006/0162642 | A1 | | 7/2006 | Morse | |

OTHER PUBLICATIONS

PCT International Search Report dated Jan. 26, 2010; International Appl. No. PCT/US09/56938; Filing Date Sep. 15, 2009.

* cited by examiner

*Primary Examiner* — Thomas Denion
*Assistant Examiner* — Brian Inacay
(74) *Attorney, Agent, or Firm* — Boyle Fredrickson, S.C.

(57) ABSTRACT

An ocean wave electrical generating system is described. The generating system is adapted to harness the energy of ocean waves in a wide variety of applications and conditions. The system reduces the effect of the variable input energy from ocean waves by initially storing the energy in the form of potential energy and subsequently transforming the potential energy to kinetic energy. The release of kinetic energy is coupled with generators which are isolated from the effects of the variable input energy into the system by this process. This system is developed to utilize the variable potential energy available and to provide a constant kinetic energy output.

15 Claims, 6 Drawing Sheets

OCEAN WAVE ELECTRICAL GENERATOR

CROSS-REFERENCE TO RELATED APPLICATIONS

This application claims priority to U.S. provisional application Ser. No. 61/096,896, filed Sep. 15, 2008, the entire contents of which is incorporated herein by reference.

BACKGROUND OF THE INVENTION

1. Field of the Invention

The invention relates to an electrical generation system. More specifically, the present invention relates to a system adapted to convert the energy of an ocean wave into electricity. Specifically, a preferred embodiment of the present invention relates to an electrical generator adapted to use the kinetic energy of an ocean wave to drive an electrical generator at 60 hertz for connection to the electrical grid.

2. Discussion of the Related Art

As is known to those skilled in the art, ocean waves possess a significant amount of energy and present a largely, untapped source of renewable energy. However, harnessing this energy presents significant challenges, including: variable wave properties, periodic wave input, and a severe operating environment.

Attempts to harness this energy have most commonly utilized a float member connected to a push rod. The push rod is then connected to one of several means of generating energy. For example, a magnetic core may be connected, either directly or through a drive mechanism, to the push rod. The motion of the rod causes a magnetic core to pass back and forth through a coil, generating an electric current. Similarly, the push rod may drive a hydraulic motor which, in turn, rotates the shaft of a generator. Still other methods allow the wave to pass directly through a turbine to generate electricity.

However, such generators have not been fully met without incurring various disadvantages. One common disadvantage of such generators is that the electricity is only produced as the wave passes through the generator. While the generator is waiting for the next wave to arrive, no electricity is produced. Although some generators have improved construction to generate electricity during both a peak and a trough of the wave, the electrical output is still not constant. Variables, such as wave height and frequency, result in periodic output of varying magnitude and duration. Therefore, a preferred solution will convert the variable and periodic wave energy input to a constant electrical energy output.

In addition, the wave generators function in a harsh operating environment. They must be installed in oceans or other bodies of water with consistent wave energy. Previous generators typically required installation substantially as a single unit. Such an installation is challenging in this environment. Further, repair and maintenance of such generators are similarly challenging. Therefore, a preferred solution will provide an easier method of construction and maintenance of the generation system.

SUMMARY AND OBJECTS OF THE INVENTION

Consistent with the foregoing and in accordance with the invention as embodied and broadly described herein, an ocean wave electrical generator is described in suitable detail to enable one of ordinary skill in the art to make and use the invention.

In one embodiment of the invention, an electrical generation system is disclosed which converts periodic kinetic energy from an ocean wave input into the generation system into a constant electrical energy output. The generation system includes a tapered water channel The tapered water channel has an input end wherein a volume of water enters as a wave and an output end containing a discharge opening, through which the water exits. The discharge opening is positioned above a water wheel such that the water exiting the discharge opening causes the water wheel to rotate.

The generation system further includes a generator tower. The generator tower includes a first endless drive, such as a belt, chain, rope, or cable. The first endless drive runs from the upper end to the lower end of the tower and returns to the upper end of the tower. Supports are connected to the first endless drive and travel up and down the tower with the endless drive to support a pallet or a weight, e.g., a heavy ball. The generator tower further includes a sprocket which is rotated by the motion of the first endless drive. The sprocket, in turn, causes a second endless drive to move. The second endless drive connects the sprocket and a pulley, or a series of pulleys, which turn generators.

The generation system further includes a helical pallet return member. The helical pallet return member includes a third endless drive that engages each pallet at an input feed of the pallet return member. The third endless drive is driven by the rotation of the water wheel and transfers the pallets from the input feed, up the spiral of the return member, and out the output feed of the return member. As a pallet support, connected to the first endless drive of the generator tower, moves past the output feed of the return member, a pallet moves onto the pallet support. The weight of the pallet causes the endless drive to continue moving until the pallet reaches the input feed of the helical pallet return member. The pallet then moves off the pallet support and back onto the input area of the return member.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Preferred exemplary embodiments of the invention are illustrated in the accompanying drawings in which like reference numerals represent like parts throughout, and in which.

Figure 1:
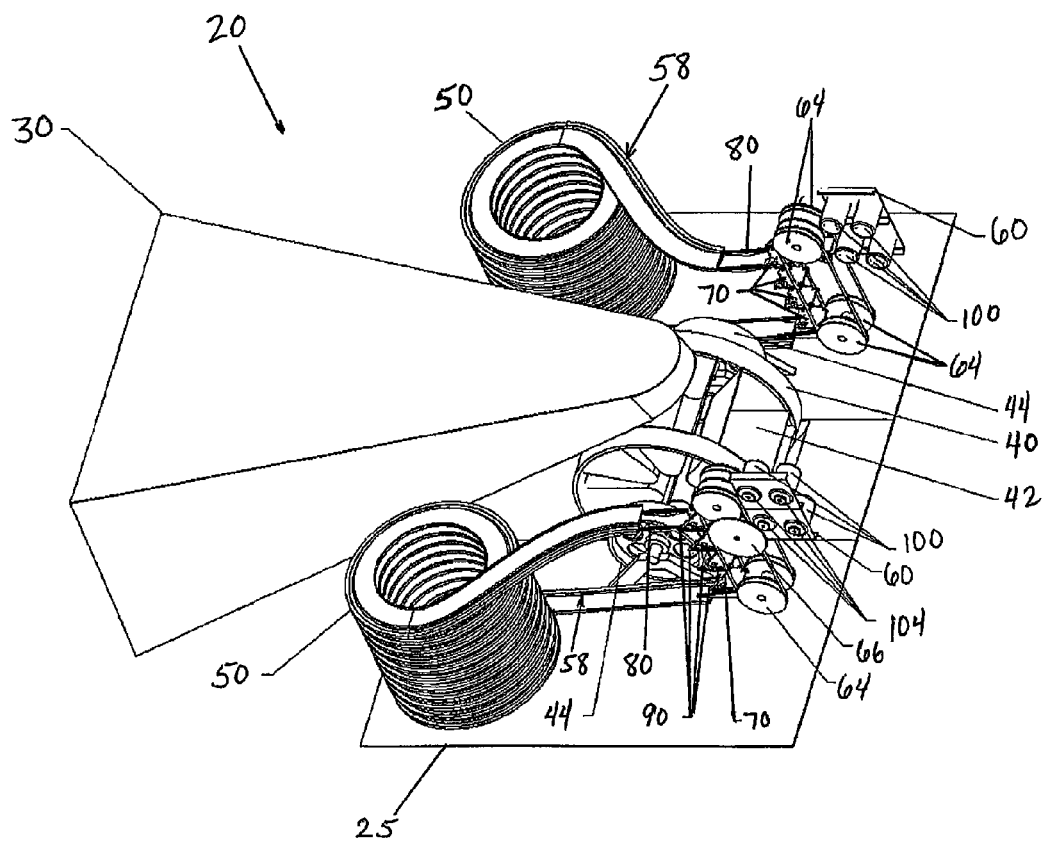
FIG. 1 is an isometric view of a first embodiment of an ocean wave electrical generator.
Figure 2:
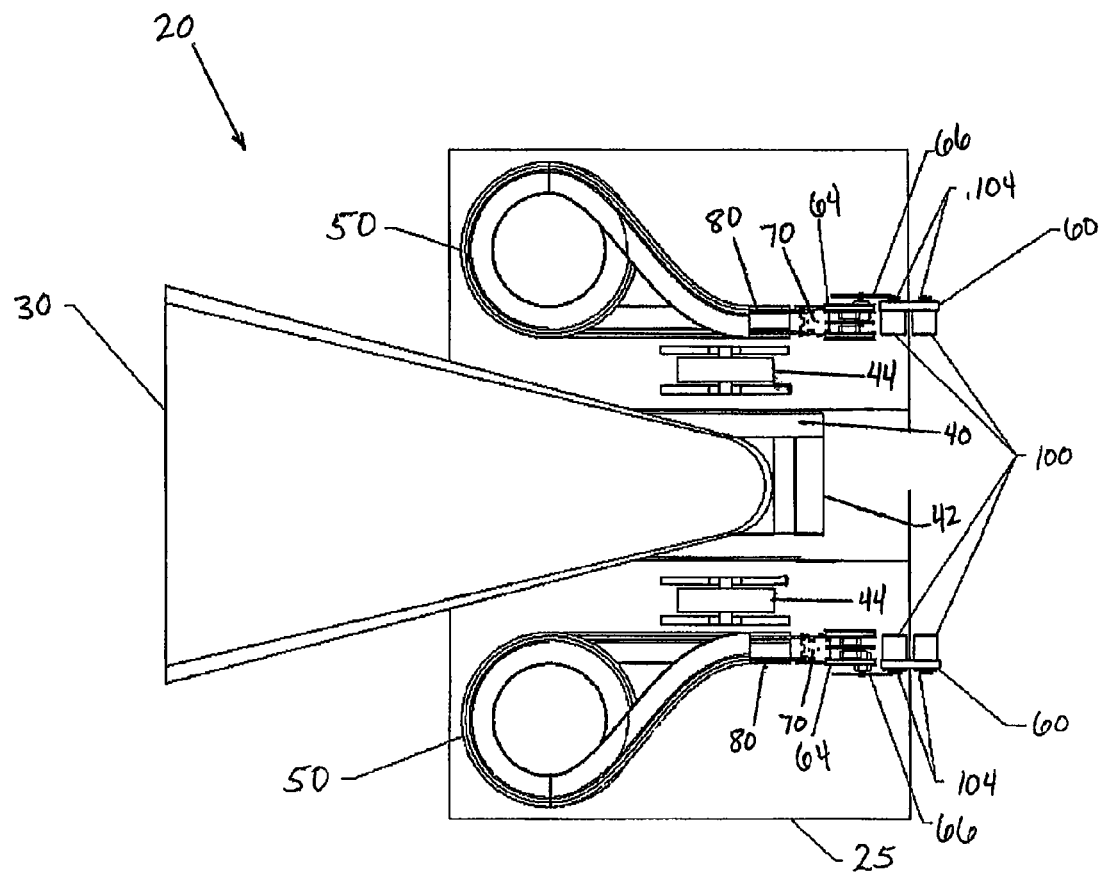
FIG. 2 is a top view of the generator of FIG. 1.
Figure 3:
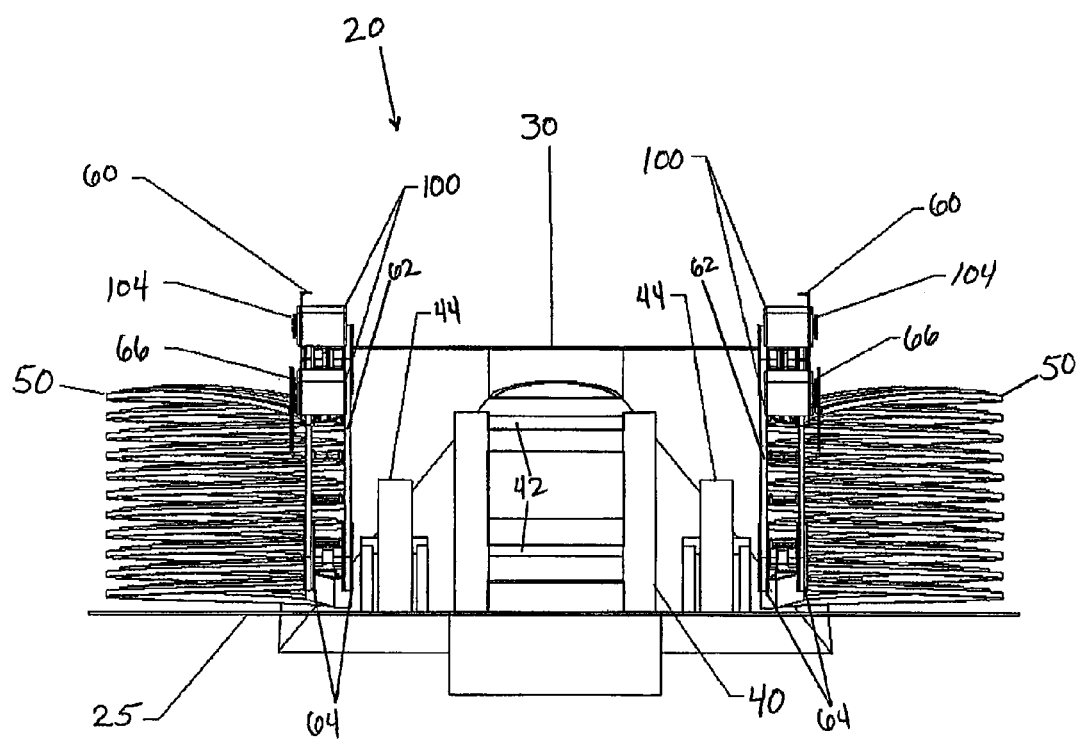
FIG. 3 is a side view of the generator of FIG. 1.
Figure 4:
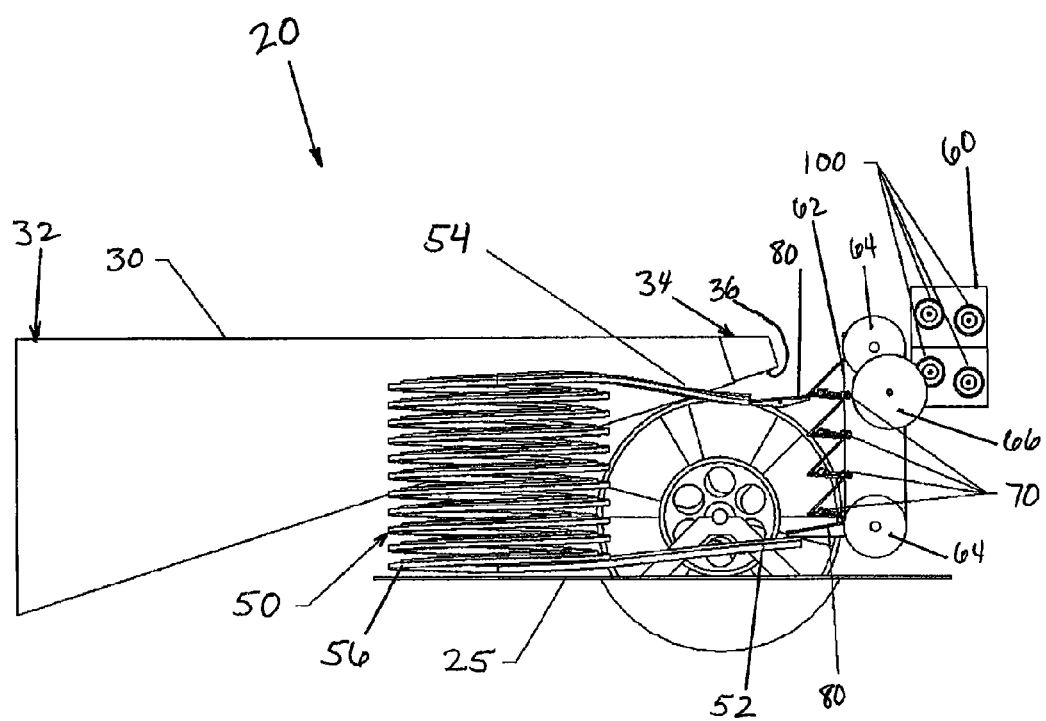
FIG. 4 is a front view of the generator of FIG. 1.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the words "connected," "attached," or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

In basic form, an ocean wave electrical generator converts periodic kinetic energy from ocean waves into constant electrical energy. Incoming ocean waves are channeled through the tapered chute, and the water is discharged over a water wheel, causing it to turn. As the water wheel turns, it drives the pallet drive chain, which, in turn, moves pallets from the bottom of the helix to the top of the helix. The pallets are then gravity fed onto pallet support members on the generator towers. The water wheel, pallet drive, helix, and pallets are designed to provide a constant supply of pallets ready to enter the next pallet support as it passes the output feed portion of the helix.

The weight of the pallets causes the pallet support members to lower down the generator tower. As each pallet reaches the lower end of the generator tower, it is returned to the input feed of the helix. The returned pallet again engages the pallet drive to repeat the cycle as it begins moving back up to the top of the helix. By maintaining a continuous queue of pallets to be transferred to the pallet support members, a constant weight of pallets, and consequently a constant force, is present on the pallet support members. This constant force causes the pallet support members and the pallet support drive to which they are connected to move at a constant speed.

The generator tower has a sprocket which is rotated as a result of the motion of the pallets lowering down the generator tower. The sprocket is further connected to a pulley mounted on a shaft of a generator by a drive member. Because the force generated by the weight of the pallets drives the pallet supports downward at a constant speed, the sprocket similarly rotates at a constant speed. This, in turn, drives the generator at a constant speed. Preferably, the ratio of the sprocket and the generator pulley results in sixty hertz electrical energy generation.

Further, the generator system is preferably modularly constructed. The generator system has a platform on which the remaining assemblies are affixed. The remaining assemblies consist generally of a tapered water chute, a water wheel, at least one helical member and at least one generator tower. The tapered water chute is connected near the rear of the platform and extending beyond the platform such that the intake opening is positioned to allow waves to enter. The water wheel is generally positioned centrally on the platform such that the discharge output of the tapered water chute is positioned over the water wheel. A helix is mounted near the rear of the platform and to one side of the tapered water chute. Preferably, a second helix is mounted on the opposing side of the tapered water chute. A generator tower is mounted near the front of the platform, and one generator tower is mounted for each helix. The generator tower is further configurable to provide sufficient generating capacity based on the input energy entering the wave generator. Preferably, a two-by-two matrix of generators is mounted near the upper end of the tower generator. Such modular construction will ease installation and maintenance of the generation system.

2. Detailed Description of Preferred Embodiments

Specific embodiments of the present invention will now be further described by the following, non-limiting examples which will serve to illustrate various features of significance. The examples are intended to merely facilitate an understanding of ways in which the present invention may be practiced and to further enable those of skill in the art to practice the present invention. Accordingly, the examples should not be construed as limiting the scope of the present invention.

Turning initially to FIGS. 1-4, a preferred embodiment of an ocean wave electrical generation system 20 is depicted. The generation system 20 is designed for modular construction and consists generally of a platform 25, a tapered water channel chute 30, a water wheel 40, and, preferably, two helixes 50 and generator towers 60.

Figure 5:
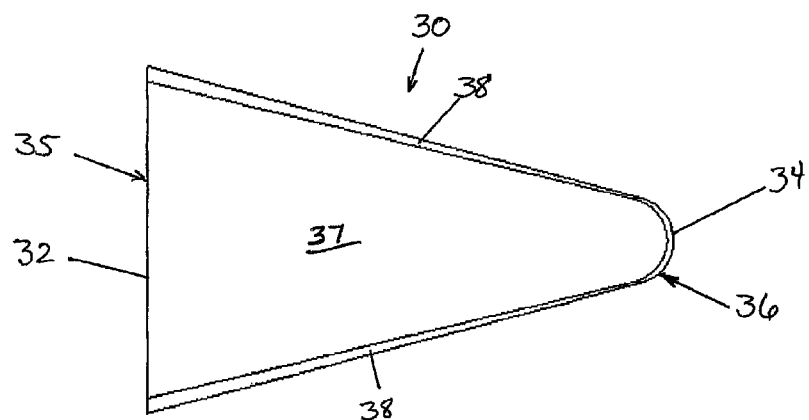
FIG. 5 is a top view of the tapered water channel.
Figure 6:
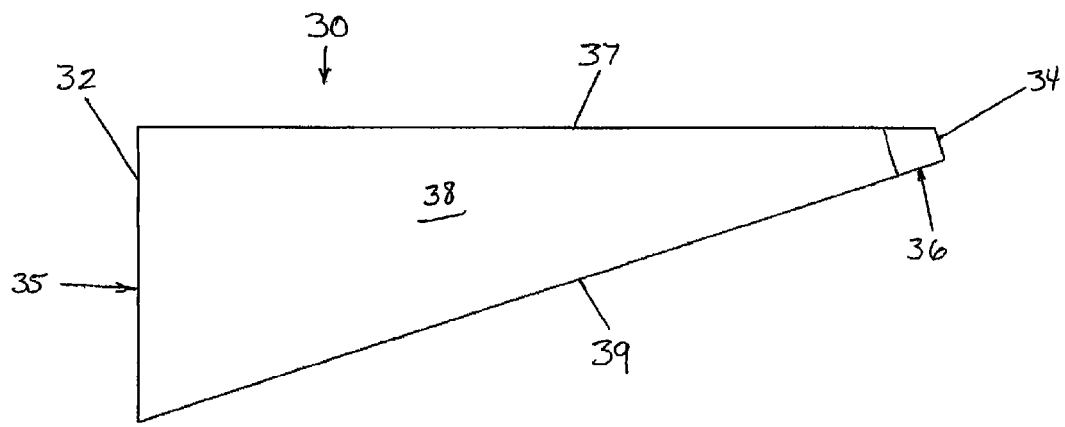
FIG. 6 is a side view of the tapered water channel.

The tapered water channel chute 30, as best seen in FIGS. 5 and 6, includes an input end 32 and an output end 34. According to the illustrated embodiment, an upper surface 37 is disposed substantially in a horizontal plane. A lower surface 39 extends along a slope from its lowest point at the input end 32 of the chute 30 to a higher point at the output end 34 of the chute 30. Each side 38 extends between the upper surface 37 and the lower surface 39 and tapers inward such that the two sides 38 are furthest apart at the input end 32 and closest together at the output end 34 of the chute 30. An intake opening 35 is defined at the input end 32 by the upper surface 37, lower surface 39, and the two sides 38. A discharge opening 36 is defined in the lower surface 39 at the output end 34. The discharge opening is aligned above the water wheel 40.

Referring again to FIGS. 1-4, the water wheel 40 is composed of a series of troughs 42 radially positioned about the wheel 40. The water wheel 40 drives the pallet drive chain pulley 44 preferably by directly coupling the pallet drive chain pulley 44 to an axle of the water wheel 40. However, the pallet drive chain pulley 44 may be driven by the water wheel 40 according to any means known in the art, including but not limited to a gearbox, a chain drive, and a belt drive disposed between the water wheel 40 and the pallet drive chain pulley 44.

The pallet drive chain pulley 44 is, in turn, coupled to the pallet drive 58. The pallet drive 58 is an endless drive, for example, a belt, a chain, a rope, a cable, or other suitable drive member. The pallet drive 58 extends along the length of the helix 50 and engages a plurality of drive chain engagement members, not shown. Each drive chain engagement member is mounted on a pallet 70 and is configured to releasably engage the pallet 70 to the pallet drive 58.

Figure 7:
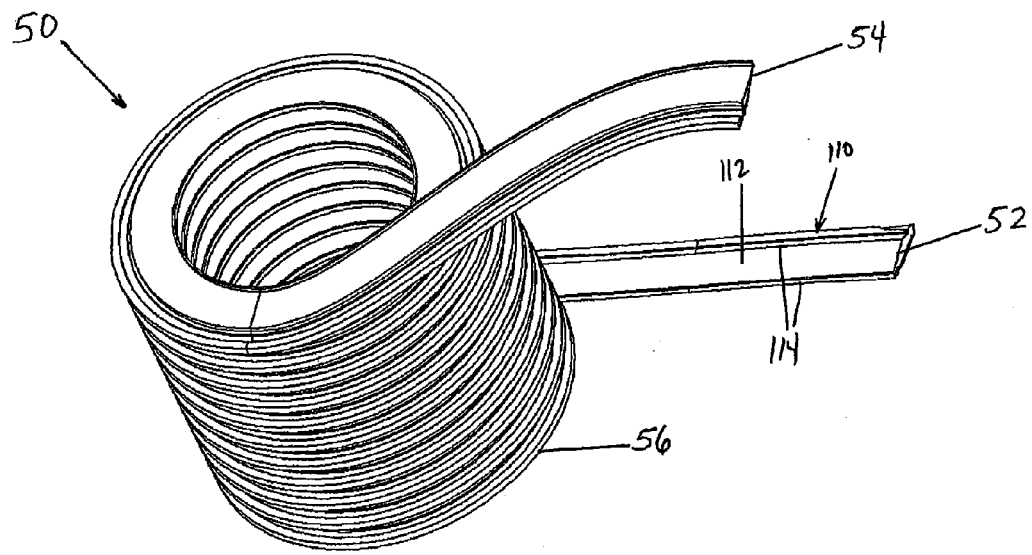
FIG. 7 is an isometric view of the helix.
Figure 8:
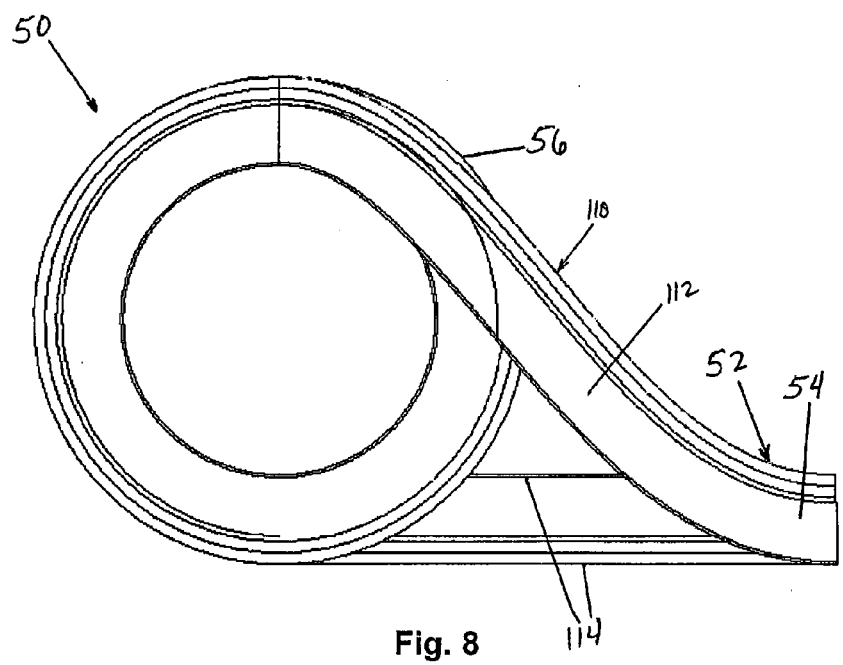
FIG. 8 is a top view of the helix.

The helix 50, as best seen in FIGS. 7 and 8, is comprised generally of a track 110 designed to carry the pallets 70 and is affixed to the platform 25 adjacent to the chute 30. The helix 50 is preferably made up of an extruded plastic material, but may be made of any suitable material. In the illustrated embodiment, the track 110 consists of a generally smooth upper surface 112 with a raised edge 114 on each side of the upper surface 112. The upper surface 112 of the track 110 supports the wheels of each pallet 70 as the pallets 70 move along the helix 50. Each raised edge 114 provides a guide to the wheels of each pallet 70 to retain the pallet 70 on the helix 50. While one method of engaging the track 110 and pallet 25 is disclosed in detail herein, it is contemplated that the track and pallet engagement may consist of any combination known to one in the art, including but not limited to glides, runners, pads, and the like. The helix 50 further includes an input feed area 52, and output feed area 54, and a spiral area 56. The input feed area 52 is on the lower end of the track and engages the lower pallet transfer member 80 at a first end. The second end of the input feed area 52 is connected to the spiral area 56 of the helix 50. The spiral area 56 of the helix 50 curls the track 110 in an upward fashion, connecting the input feed area 52 and a first end of the output feed area 54 of the helix 50. The second end of the output feed area 54 of the helix 50 engages the upper pallet transfer member 80.

The pallet transfer member 80 is sized to hold a single pallet 70. The upper pallet transfer member 80 pivots from a first position in which it engages the output feed area 54 of the helix 50 to a second position in which it engages a pallet support member 90. In the first position, the upper pallet transfer member 80 is biased such that it slopes toward the output feed area 54. In the second position, the upper pallet transfer member 80 slopes toward the pallet support member 90, and the distal end of the pallet transfer member 80 is elevated above the surface of the track 110 on the output feed area 54 creating a stop such that another pallet 70 cannot move onto the transfer member 80.

The generator tower 60, preferably, includes a pair of pallet support endless drives 62; however, it is contemplated that either a single or more than two pallet support endless drives 62 could similarly be used. Each endless drive 62 is connected to an upper and a lower pallet support pulley 64. Each set of drive 62 and pulleys 64 is aligned generally parallel to each other and extends substantially in a vertical plane. The generator tower 60 further includes a series of pallet support members 90. Each pallet support member 90 is connected to and extends between the pallet support endless drives 62 on a first side of the pallet support member 90. Further, the pallet support member 90 extends generally away from the endless drives 62. The end of the support member 90 furthest from the endless drives 62 engages the upper and lower pallet transfer members 80.

At least one of the pallet support pulleys 64 is coupled to a sprocket 66 on the generator tower 60. The pulley 64 and sprocket 66 may be directly coupled by an axle extending between the two, or alternately may be coupled by any means known to one in the art, such as a gearbox, a belt, a chain, or a cable. The sprocket 66 drives at least one generator pulley 104. The sprocket 66 uses at least one endless drive to rotate the generator pulleys 104.

Each generator pulley 104 is mounted on a shaft of a generator 100. The rotation of each generator pulley 104 causes each generator 100 to rotate and to generate electricity. The size of the sprocket 66 and each generator pulley 104, as well as the drive coupling the sprocket 66 and the generator pulley 104, are designed such that the generator pulley 104 rotates at the desired speed for each generator 100 to produce sixty hertz electrical energy.

In operation, the ocean wave electrical generation system 20 converts the periodic kinetic energy of an ocean wave into constant electrical energy. The tapered water channel chute 30 is designed to direct the water from a wave entering the intake opening 35 wave through the chute 30 and out the discharge opening 36 into a trough 42 on the water wheel 40 positioned below the discharge opening 36. The size of the intake 35 and discharge openings 36, the slope of the lower surface 39, and the taper between the sides 38 are adaptable to the local wave conditions.

Each trough 42 is aligned below the discharge opening 36 such that, as each trough 42 is filled with water, the weight of the water increases until it creates sufficient force for the water wheel 40 to rotate forward, driving the pallet drive 58. As the water wheel 40 rotates forward, the water empties out of trough 42 until the wheel 40 can no longer drive the pallet drive 58 forward. At this point, the next trough 42 is positioned under the discharge opening 36 and the cycle is repeated. The diameter of the water wheel 40, as well as the size and volume of the troughs 42, may be adjusted to accommodate the local wave conditions. In this manner, the waves create a continuous, incremental motion of the water wheel 40 and the pallet drive 58.

The pallet drive 58 engages each pallet 70 as it is transferred onto the input feed 52 of the helix 50 and moves the pallets along the track 110 as it is driven by the water wheel 40. The pallet 70 moves up the spiral 56 of the helix 50 until it reaches the output feed area 54. At this point, the pallet 70 disengages from the pallet drive 58. The output feed area 54 is generally sloped downward, such that gravity forces each pallet 70 in the output feed area 54 toward the upper pallet transfer member 80.

The upper pallet transfer member is sized to hold a single pallet 70. Therefore, if the upper pallet transfer member 80 is already holding a pallet 70, the pallet 70 most recently released by the pallet drive 58 will stop on the output feed area 54 until each of the previous pallets 70 has cleared the upper pallet transfer member 80. The upper pallet transfer member 80 is biased such that it slopes toward the output feed area 54. As a pallet support member 90 approaches the upper pallet transfer member 80, an end of the pallet support member 90 engages the upper pallet transfer member 80 causing the pallet transfer member 80 to pivot. The upper pallet transfer member 80 pivots such that the input side of the pallet transfer member 80 raises above the track 110 on the output feed 54, creating a stop by which the next pallet 70 on the track 110 is prevented from entering the pallet transfer member 80. Further, the pivoting of the upper pallet transfer member 80 causes the upper surface of the pallet transfer member 80 to be sloped toward the pallet support member 90 currently engaged with the pallet transfer member 80. The pallet 70 on the pallet transfer member 80 is, therefore, gravity-fed onto the pallet support member 90. As the pallet support member 90 continues to move downward, it disengages the upper pallet transfer member 80. The upper pallet transfer member 80 is again biased such that it slopes toward the output feed area 54. Another pallet 70 is then gravity-fed onto the pallet transfer member 80, and the cycle repeats as the next pallet support member approaches the upper pallet transfer member 80.

The weight of the pallets 70 on the pallet support members 90 cause the pallet support members 90 to move downward. The motion in the pallet support members 90 drives the pallet support endless drive 62 to which the support members 90 are coupled. As the pallets 70 and pallet support members 90 reach the lower portion of the generator tower 60, the pallet support member 90 engages the lower pallet transfer member 80. The lower pallet transfer member 80 slopes toward the input feed 52 of the helix 50. The pallet 70 on the pallet support member 90 engaged with the lower pallet transfer member 80 is then gravity-fed onto the input feed 52. The drive chain engagement member coupled to the pallet 70 then engages the pallet drive 58 and the pallet 70 repeats its cycle as it begins to travel back up the helix 50.

The motion of the pallet support endless drives 62 causes the sprocket 66 on the generator tower 60 to rotate. The sprocket 66, in turn, causes the endless drive to rotate the generator pulley 104. The generator pulley 104, in turn, rotates the shaft of the generator, causing the generator to output electrical energy.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, so as to provide a paver block with a cavity capable of storing fluid. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

I claim:

1. An electrical generation system, comprising:
   a tapered water channel with an input end and an output end, wherein the output end includes a discharge opening;
   a water wheel positioned below and rotated by water from the discharge opening;
   a plurality of pallets;
   a generator tower further comprising,
      a first endless drive connected to an upper end and a lower end of the generator tower,
      at least one pallet support wherein each pallet support is connected to the first endless drive to move down a first side of the tower and up a second side of the tower and wherein the plurality of pallets separately engage each of the pallet supports such that the weight of the pallet causes the pallet support to move down the first side of the tower, and
      at least one second endless drive coupled to the first endless drive and driving at least one generator mounted on the generator tower;
   a helical pallet return member including an input feed wherein each pallet enters the input feed at the lower end of the generator tower and an output feed wherein each pallet exits the output feed at the upper end of the generator tower; and
   a third endless drive engaging each pallet at the input feed of the pallet return member and moving the pallets to the output feed of the pallet return member, wherein the third endless drive is driven by the rotation of the water wheel.

2. The electrical generation system of claim 1 further comprising:
   a second generator tower, the second generator tower including:
      a fourth endless drive connected to an upper end and a lower end of the second generator tower,
      at least one additional pallet support wherein each additional pallet support is connected to the fourth endless drive to move down a first side of the second generator tower and up a second side of the second generator tower and wherein a portion of the plurality of pallets separately engages each of the additional pallet supports such that the weight of the pallet causes the additional pallet supports to move down the first side of the second generator tower, and
      at least one fifth endless drive coupled to the fourth endless drive and driving at least one additional generator mounted on the second generator tower;
   a second helical pallet return member including an input feed wherein each pallet from the portion of the plurality of pallets enters the input feed at the lower end of the second generator tower and an output feed wherein each pallet from the portion of the plurality of pallets exits the output feed at the upper end of the second generator tower; and
   a sixth endless drive engaging each pallet from the portion of the plurality of pallets at the input feed of the second helical pallet return member and moving the pallets to the output feed of the second helical pallet return member, wherein the sixth endless drive is driven by the rotation of the water wheel.

3. The electrical generation system of claim 1 wherein the generator tower further includes:
   a fourth endless drive connected to the upper end and the lower end of the generator tower, wherein each pallet support is connected to the fourth endless drive; and
   at least one fifth endless drive coupled to the fourth endless drive and driving at least one additional generator mounted on the generator tower.

4. An electrical generation system, comprising:
   a drive member configured to move as a function of a plurality of periodic ocean waves received as an input to the drive member;
   a plurality of pallets;
   a generator tower further comprising:
      a first endless drive connected to an upper end and a lower end of the generator tower,
      at least one pallet support wherein each pallet support is connected to the first endless drive to move down a first side of the generator tower and up a second side of the generator tower and wherein the plurality of pallets are separate from and move on to the pallet supports such that the weight of the pallet causes the pallet support to move down the first side of the generator tower, and
      at least one generator operatively coupled to the first endless drive and mounted on the generator tower;
   a helical pallet return member including an input feed wherein each pallet enters the input feed at the lower end of the generator tower and an output feed wherein each pallet exits the output feed at the upper end of the generator tower; and
   a second endless drive engaging each pallet at the input feed of the pallet return member and moving the pallets to the output feed of the pallet return member, wherein the second endless drive is driven by the motion of the drive member.

5. The electrical generation system of claim 4 further comprising:
   a second generator tower, the second generator tower including:
      a third endless drive connected to an upper end and a louver end of the second generator tower,
      at least one additional pallet support wherein each additional pallet support is connected to the third endless drive to move down a first side of the second generator tower and up a second side of the second generator tower and wherein a portion of the plurality of pallets separately engages each of the additional pallet supports such that the weight of the pallet causes the additional pallet supports to move down the first side of the second generator tower, and
      at least one additional generator operatively coupled to the third endless drive and mounted on the second generator tower;
   a second helical pallet return member including an input feed wherein each pallet from the portion of the plurality of pallets enters the input feed at the lower end of the second generator tower and an output feed wherein each pallet from the portion of the plurality of pallets exits the output feed at the upper end of the second generator tower; and a fourth endless drive engaging each pallet from the portion of the plurality of pallets at the input feed of the second helical pallet return member and moving the pallets to the output feed of the second helical pallet return member, wherein the fourth endless drive is driven by the motion of the drive member.

6. The electrical generation system of claim 4 wherein the drive member includes;

a tapered water channel with an input end and an output end, wherein the output end includes a discharge opening; and a water wheel positioned below and rotated by water from the discharge opening, wherein the second endless drive is driven by the rotation of the water wheel.

7. The electrical generation system of claim 4 wherein the generator tower further includes:

a third endless drive connected to the upper end and the lower end of the generator tower, wherein each pallet support is connected to the third endless drive; and at least one additional generator operatively coupled to the third endless drive and mounted on the generator tower.

8. The electrical generation system of claim 4 wherein the generator tower further includes a third endless drive coupled to the first endless drive, wherein the third endless drive causes rotation of the generator.

9. An electrical generation system, comprising:

a drive member configured to move as a function of a plurality of periodic ocean waves received as an input to the drive member;

a plurality of weights configured to be moved within the electrical generation system;

a generator tower further comprising:
  a first endless drive connected to an upper end and a lower end of the generator tower,
  at least one weight support wherein each weight support is connected to the first endless drive to move down a first side of the generator tower and up a second side of the generator tower and wherein the plurality of weights are separate from and move on to the weight supports such that the weights cause the weight support to move down the first side of the generator tower, and
  at least one generator operatively coupled to the first endless drive and mounted on the generator tower;

a weight return member including an input feed wherein each weight enters the input feed at the lower end of the generator tower and an output feed wherein each weight exits the output feed at the upper end of the generator tower; and a second endless drive engaging each weight at the input feed of the weight return member and moving the weights to the output feed of the weight return member, wherein the second endless drive is driven by the motion of the drive member.

10. The electrical generation system of claim 9 further comprising:

a second generator tower, the second generator tower including:
  a third endless drive connected to an upper end and a lower end of the second generator tower,
  at least one additional weight support wherein each additional weight support is connected to the third endless drive to move down a first side of the second generator tower and up a second side of the second generator tower and wherein a portion of the plurality of weights separately engages each of the additional weight supports such that the weights cause the additional weight supports to move down the first side of the second generator tower, and
  at least one additional generator operatively coupled to the third endless drive and mounted on the second generator tower;

a second weight return member including an input feed wherein each weight from the portion of the plurality of weights enters the input feed at the lower end of the second generator tower and an output feed wherein each weight from the portion of the plurality of weights exits the output feed at the upper end of the second generator tower; and a fourth endless drive engaging each weight from the portion of the plurality of weights at the input feed of the second weight return member and moving the weights to the output feed of the second weight return member, wherein the fourth endless drive is driven by the motion of the drive member.

11. The electrical generation system of claim 9 wherein the drive member includes:

a tapered water channel with an input end and an output end, wherein the output end includes a discharge opening; and a water wheel positioned below and rotated by water from the discharge opening, wherein the second endless drive is driven by the rotation of the water wheel.

12. The electrical generation system of claim 9 wherein the generator tower further includes:

a third endless drive connected to the upper end and the lower end of the generator tower, wherein each weight support is connected to the third endless drive, and at least one additional generator operatively coupled to the third endless drive and mounted on the generator tower.

13. The electrical generation system of claim 9 wherein the generator tower further includes a third endless drive coupled to the first endless drive, wherein the third endless drive causes rotation of the generator.

14. The electrical generation system of claim 9 wherein the weight return member is a helix.

15. The electrical generation system of claim 9 wherein each of the weights is a pallet.

* * * * *